United States Patent [19]

Callan et al.

[11] Patent Number: 5,735,655
[45] Date of Patent: Apr. 7, 1998

[54] LOCK NUT ASSEMBLY FOR VEHICLE AXLES

[75] Inventors: Thomas M. Callan; Brian T. Callan, both of Defiance; Kevin R. Diven, Cecil, all of Ohio

[73] Assignee: The Defiance Stamping Company, Defiance, Ohio

[21] Appl. No.: 835,318

[22] Filed: Apr. 7, 1997

[51] Int. Cl.⁶ .............................. F16B 37/08; F16B 39/22
[52] U.S. Cl. .................. 411/291; 411/433; 411/937.2
[58] Field of Search ........................... 411/290, 291, 411/226, 433, 937.2, 432, 288

[56] References Cited

U.S. PATENT DOCUMENTS

| | | |
|---|---|---|
| 4,557,652 | 12/1985 | Lundgren . |
| 4,622,730 | 11/1986 | Steinbock . |
| 5,069,587 | 12/1991 | Levenstein . |
| 5,472,245 | 12/1995 | Meske et al. . |
| 5,609,456 | 3/1997 | Joki ........................ 411/291 X |
| 5,662,445 | 9/1997 | Hargottle et al. ............ 411/291 X |

*Primary Examiner*—Neill R. Wilson
*Attorney, Agent, or Firm*—Donald R. Fraser

[57] ABSTRACT

A lock nut assembly for vehicle axles includes a pair of cooperative annular nut members hang threads formed on the inner peripheral surfaces compliment—and cooperating with the externally threaded shank of axle spindle. The nut members are coupled together threaded fastener means and spaced axially from one another. The threaded fasteners are to be tightened when the nut members are tightened on the threaded axle spindle to form a high stressed clamping force between the threads of the nut members and the threads of the axle spindle.

6 Claims, 1 Drawing Sheet

LOCK NUT ASSEMBLY FOR VEHICLE AXLES

The present invention relates to apparatus for locking a nut assembly on an externally threaded spindle of a vehicle axle.

BACKGROUND OF THE INVENTION

It is common practice to stress an externally threaded shank portion of a bolt member by applying torque to the nut to advance the threaded portion of the nut along the threaded shank portion so that the shank portion of the bolt is placed under a desired or predetermined stress. The stress imparted to the shank portion of the bolt can be determined by using a torque reading wrench to measure the torque applied to the nut or by using other means to measure the applied force by a spanner wrench. Obviously, the torque may be applied to a nut or the head portion of a bolt in a usual nut/bolt fastener arrangement. In order to secure wheels to associated axle spindles, it is known to use a double nut arrangement wherein one nut is tightened against the other nut to be locked. In such locking arrangements, the locking nut must be tightened forcefully against the main nut. Thus, it is difficult to determine the exact position of the main nut on the threaded axle spindle. Therefore, it is difficult to be certain that the main nut is tightened within predetermined torque range.

Also, it is known to employ a plurality of jack bolts threadably engaged within openings in a flange on a fastener to stress a shank part of the fastener. The flange may be a collar retained on a shaft by a retainer, a nut on a threaded end of a bolt, or the head portion of a bolt. The jack bolts can be arranged in the flange on an end of a shaft. When the flange is in the form of a ring, for example, a retainer such as a split ring, a snap ring, or interlocking fastener may be used to secure the flange to the shank. The magnitude of the compressive force on each jack bolt is only a fraction of the stress imparted to the shank portion of the fastener. A nut member or head portion of a standard nut and bolt assembly, provides sufficient space for threaded engagement of bolt to stress the shank part of the bolt to a magnitude that will at least equal the strength of the bolt shank.

These designs have a complex construction and are complicated and expensive to manufacture.

SUMMARY OF THE INVENTION

It is an object of present inventions to produce a lock nut assembly which is relatively simple in design, can be economically manufactured, and will produce to necessary locking function desired.

According to one embodiment of the invention, the above as well as other objectives and advantages may be achieved, there is provided a lock nut assembly adapted to be locked on an externally threaded shank having a longitudinal axis comprising at least a pair of coaxially oriented annular nut members having threads formed on the inner peripheral surfaces complimenting and cooperating with the externally threaded shank; spaced apart boss means extending from at least one of the facing surfaces of the nut members toward the facing surface of the other nut member; threaded shank means extending from the facing surface of at least one of the nut members, the shank means extending in a direction parallel to the longitudinal axis of the externally threaded shaft; aperture means in the other of the nut members for receiving the threaded shank means; and nut means receivable on the threaded shank means for tightening the nut members to effect a jamming action between the threads formed on the inner peripheral surfaces of the nut members and the externally threaded shank to restrict relative rotational movement there between.

BRIEF DESCRIPTION OF THE DRAWINGS

The above as well as other objects and advantages of the invention will become readily apparent to one skilled in the art by reading the following detailed description of the preferred embodiments of the invention, when considered in the light of the accompanying drawings, in which.

DESCRIPTION OF THE PREFERRED EMBODIMENTS

Figure 1:
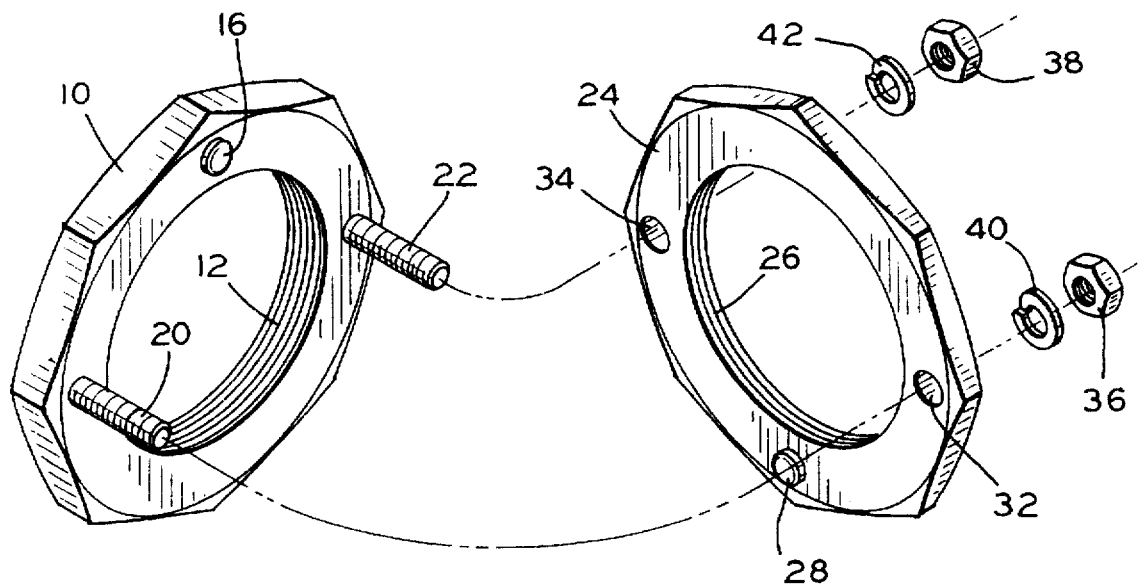
FIG. 1 is an exploded view of a locking nut assembly in accordance with the present invention.
Figure 2:
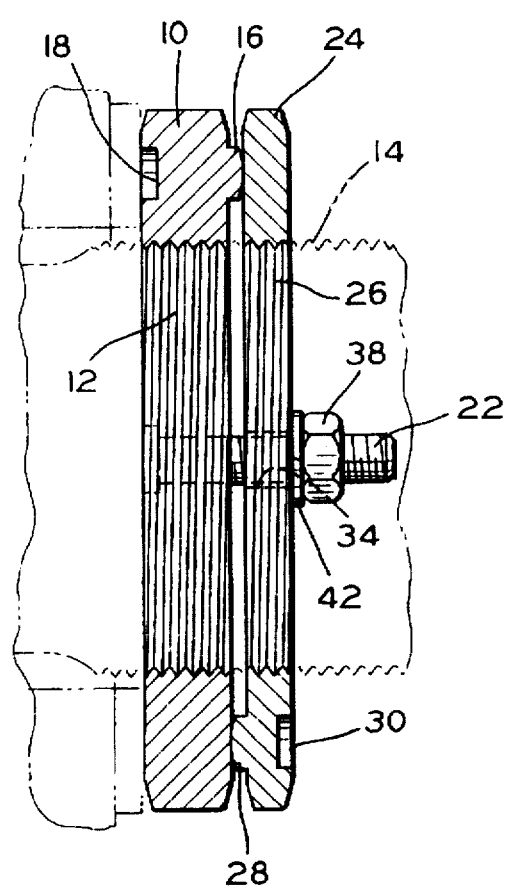
FIG. 2 is an enlarged sectional view of the assembly illustrated in FIG. 1 in a operative position.

Referring to the drawings, there is illustrated in FIG. 1 and 2 a lock nut assembly embodying the features of the present invention. An annular nut member 10 is illustrated. The nut member 10 is provided with threads 12 formed on the inner peripheral surface. The threads 12 are formed to compliment and cooperate with the externally threaded shank 14 illustrated in dotted lines in FIG. 2.

A boss 16 is formed by staking the material used to form the nut member 10. The boss 16 extends outwardly from a surface of the body of the nut member 10. Since the boss 16 is formed by a staking operation, a cavity 18 is formed on the opposing surface of the nut member 10.

A pair of diametrically opposed externally threaded shanks 20, 22 are formed integral with and are adopted to extend outwardly from the same surface of the nut member 10 as the boss 16. The shanks 20, 22 extend in parallel relation to one another and to the longitudinal axis of the externally threaded shaft 14 to which the nut member 10 is to be fitted.

A second nut member 24 is provided with threads 26 formed on the inner peripheral surface. The threads 26 are formed to compliment and cooperate with the externally threaded shank 14 illustrated in dotted lines in FIG. 2.

A boss 28 is formed by staking the material used to form the nut member 24. The boss 28 extends outwardly from a surface of the body of the nut member 24. The surface from which the boss 28 extends is in facing relation to the surface of the nut member 10 from which the boss 16 is adapted to extend. Since the boss 28 is formed by a staking operation, a cavity 30 is formed to extend inwardly from the opposing surface of the nut member 24.

A pair of diametrically opposed apertures 32, 34 are formed in the nut member 24. The apertures 32, 34 are provided to readily receive the externally threaded shanks 20, 22, respectively.

In the assembled form, the locking nut assembly is maintained in an assembled unitary condition by nuts 36, 38 and cooperating respective lock washers 40, 42. When the nuts 36, 38 are tightened, the bosses 16, 28 are caused to physically contact the opposing facing surface of the opposing nut member 24, 10, respectively. The threads 26 are formed such that they will satisfactorily engage with the threads engaged by the threads 12 of the nut member 10.

The application of the lock nut assembly of the invention is accomplished by initially causing the annular nut member 10 to be received on the externally threaded shaft 14 and rotated onto the threads of the shaft 14. As the nut member 10 is rotated and moved axially of the shaft 14, the threads 26 of the second nut member 24 become threadably engaged on the threads of the shaft It will be understood that engagement of the threads 26 of the second nut member 24 is facilitated due to the floatable relation between the nut members 10 and 24. The nut member 10 is then tightened, preferably by a torque wrench until the desired torque is reached. Next, the nuts 36, 38 are tightened sufficiently to, in effect apply axial stress between the threads 12, 26 of the nut members 10, 24, respectively, and the associated threads of the externally threaded shaft 14. This relation is maintained since the lock washers 40, 42 will prevent the associated nuts 36, 38 from backing off their respective threaded shanks 20, 22.

Figure 3:
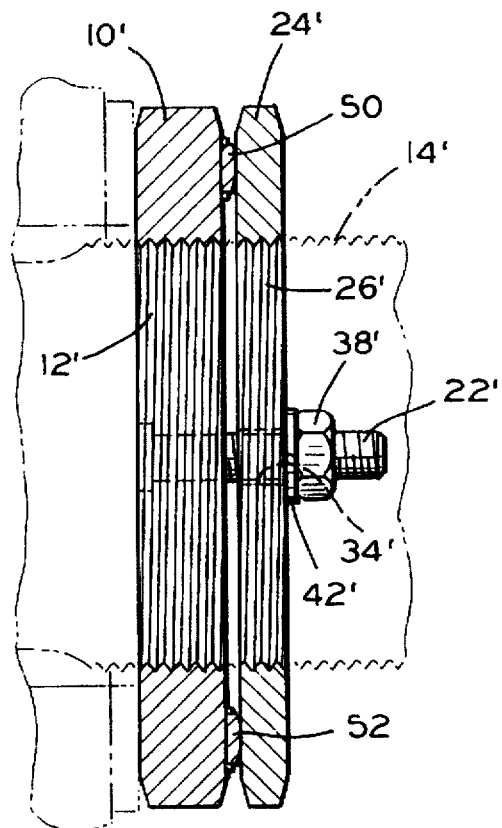
FIG. 3 is a view similar to FIG. 2 illustrating an alternative embodiment.

An alternative embodiment of the invention is illustrated in FIG. 3. The illustrated embodiment differs from the embodiment illustrated in FIGS. 1 and 2 in the structure of the spacing boss members. More specifically, the boss members 16 and 28 of the embodiment of FIGS. 1 and 2 are formed from the material of the with the threads engaged by the threads 12 of the nut member 10.

The application of the lock nut assembly of the invention is accomplished by initially causing the annular nut member 10 to be received on the externally threaded shaft 14 and rotated onto the threads of the shaft 14. As the nut member 10 is rotated and moved axially of the shaft 14, the threads 26 of the second nut member 24 become threadably engaged on the threads of the shaft 14. It will be understood that engagement of the threads 26 of the second nut member 24 is facilitated due to the floatable relation between the nut members 10 and 24. The nut member 10 is then tightened, preferably by a torque wrench until the desired torque is reached. Next, the nuts 36, 38 are tightened sufficiently to, in effect apply axial stress between the threads 12, 26 of the nut members 10, 24, respectively, and the associated threads of the externally threaded shaft 14. This relation is maintained since the lock washers 40, 42 will prevent the associated nuts 36, 38 from backing off their respective threaded shanks 20, 22.

An alternative embodiment of the invention is illustrated in FIG. 3. The illustrated embodiment differs from the embodiment illustrated in FIGS. 1 and 2 in the structure of the spacing boss members. More specifically, the boss members 16 and 28 of the embodiment of FIG. 1 and 2 are formed from the material of the respective nut members 10 and 24, while in the alternative embodiment of FIG. 3 the corresponding boss members are formed by separate elements which are brazed or otherwise affixed to one or the other or both of the nut members. More specifically, in describing the embodiment of FIG. 3, like or similar elements with those of the embodiment of FIGS. 1 and 2 will be indicated by prime reference numerals and a detailed description will not be made. Accordingly, it will be noted that the annular nut member 10' is provided with a pair of diametrically spaced boss members 50, 52 which are brazed to the surface of the nut 10' which is in facing relative to the second nut member 24'. In other respects, the assembly of FIG. 3 functions in the same manner as that illustrated as described in respect of FIGS. 1 and 2.

In accordance with the provisions of the patent statutes, the present invention has been described in what is considered to represent its preferred embodiments. However, it should be understood that the invention can be practiced otherwise than as specifically illustrated and described without departing from its spirit or scope.

What is claimed is:

1. A lock nut assembly adapted to be locked on an externally threaded shank having a longitudinal axis comprising:

at least a pair of coaxially oriented nut members having facing surfaces and having threads formed on the inner peripheral surfaces complimenting and cooperating with the externally threaded shank, said nut members containing wrench receiving flats on the outer circumferential surfaces thereof;

spaced apart boss means extending from at least one of the facing surfaces of said nut members toward the facing surface of the other of said nut members, said boss means assuring a minimal spacing between the facing surfaces of said nut members;

threaded shank memos extending from the facing surface of at least one of said nut members, said shank means extending in a direction parallel to the longitudinal axis of the externally threaded shaft;

aperture means in the other of said nut members for slidingly receiving said threaded shank means, said aperture means enabling said nut members to readily move axially of one another during the application of the assembly on the externally threaded shank; and nut means receivable on said threaded shank means for tightening said nut members to effect an axial movement thereof to effect a jamming action between the threads formed on the inner peripheral surfaces of said nut members and the externally threaded shank to restrict relative rotational movement between said nut members and externally threaded shank.

2. A lock nut assembly as defined in claim 1 wherein said spaced apart boss means are staked.

3. A lock nut assembly as defined in claim 1 wherein said spaced apart boss means include formed metal members affixed to the respective nut member.

4. A lock nut assembly as defined in claim 1 wherein said threaded shank means are integral with the respective nut member.

5. A lock nut assembly as defined in claim 1 wherein to said aperture means cooperate with said threaded shank means to permit one of said nut members to be axially movable in respect of the other of said nut members until said nut means is threadably tightened into said threaded shank means to effect a jamming action of the threads of said nut member.

6. A method of locking a lock nut assembly on an externally threaded shank having a longitudinal axis comprising the steps of:

assembling at least a pair of coaxially oriented nut members having facing surfaces and having threads formed on the inner peripheral surfaces complimenting and cooperating with the externally threaded shank, the nut members containing wrench receiving flats on the outer circumferential surfaces thereof;

spacing the nut members apart by spaced apart boss means extending from at least one of the facing surfaces of the nut members toward the facing surface of the other of the nut members, the boss means assuring a minimal spacing between the facing surfaces of the nut members;

providing threaded shank means extending from the facing surface of at least one of the nut members, the shank means extending in a direction parallel to the longitudinal axis of the externally threaded shaft;

providing aperture means in the other of the nut members for slidingly receiving the threaded shank means, the aperture means enabling the nut members to readily move axially of one another during the application of the assembly on the externally threaded shank;

applying nut means to the threaded shank means; and tightening the nut means to cause the nut members to effect an axial movement of the nut members to effect a jamming action between the threads formed on the inner peripheral surfaces of the nut members and the externally threaded shank to restrict relative rotational movement between the nut members and externally threaded shank.

* * * * *

UNITED STATES PATENT AND TRADEMARK OFFICE
CERTIFICATE OF CORRECTION

PATENT NO. : 5,735,655
DATED : April 7, 1998
INVENTOR(S) : Thomas M. Callan et al.

It is certified that error appears in the above-indentified patent and that said Letters Patent is hereby corrected as shown below:

Column 3, line 5, after "shaft" insert --14.--

Column 4, Claim 1, line 17, change "memos" to --means--.

Column 4, Claim 5, line 43, delete "to"

Signed and Sealed this

Twentieth Day of April, 1999

Attest:

Q. TODD DICKINSON

*Attesting Officer*        *Acting Commissioner of Patents and Trademarks*